Figure 1:
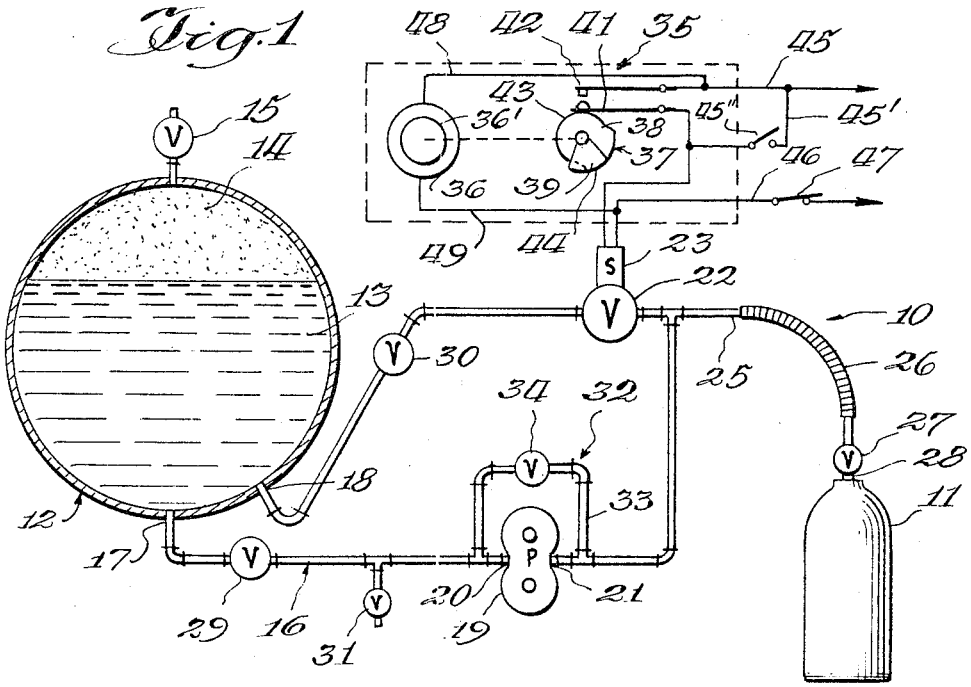

Sept. 13, 1966        A. F. GROPPE        3,272,238
METHOD AND APPARATUS FOR FILLING VESSELS
Filed Oct. 24, 1963

Inventor
Alvin F. Groppe
By [signature]
Attorney

United States Patent Office 3,272,238
Patented Sept. 13, 1966

3,272,238
METHOD AND APPARATUS FOR FILLING VESSELS
Alvin F. Groppe, Oak Lawn, Ill., assignor to Chemetron Corporation, Chicago, Ill., a corporation of Delaware
Filed Oct. 24, 1963, Ser. No. 318,617
7 Claims. (Cl. 141—5)

This invention relates to a method and apparatus for filling vessels.

It is a purpose of the invention to provide a simple and inexpensive apparatus for filling vessels with a vaporizable liquid against pressure, in which a conduit circuit is connected at both ends to a storage tank; the conduit circuit contains a pump and a valve downstream of the pump which is alternately automatically opened and closed; another conduit is connected to the conduit circuit between the discharge side of the pump and the valve, so that liquid can be passed into a vessel and vapor formed in the vessel can be passed from the vessel to the storage tank.

It is a purpose of the invention to provide a method of filling some vessels with a vaporizable liquid and of utilizing the vapor formed in the vessel to charge other vessels or bottled liquids in the bottling of carbonated beverages for instance.

Figure 2:
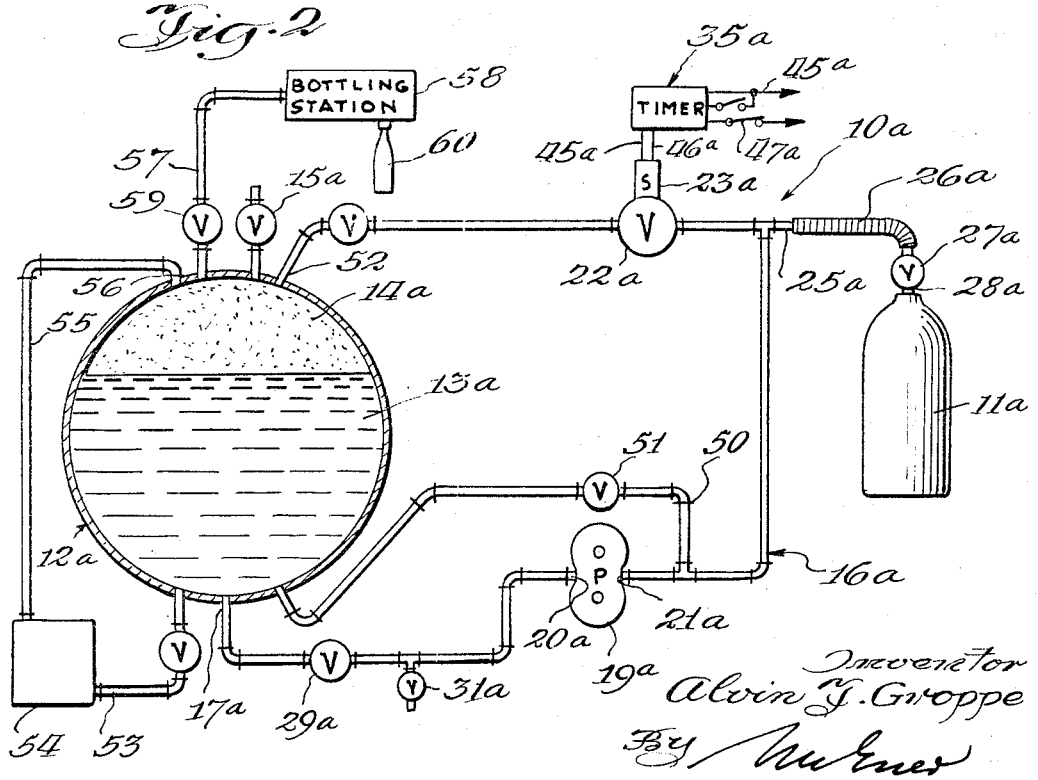

In the drawings:

FIGURE 1 is a diagrammatic view showing one embodiment of an apparatus for filling vessels; and FIGURE 2 is a diagrammatic view showing another embodiment of the apparatus for filling vessels.

Referring to the embodiment of FIGURE 1, there is shown an apparatus generally indicated at 10 for filling receptacles or vessels, such as a vessel 11. The apparatus 10 is adapted to be connected to a storage tank 12 having substantial storage capacity. The tank 12 is shown to contain vaporizable liquid 13 for example saturated liquid carbon dioxide and vapor 14 for example gaseous carbon dioxide. The storage tank 12 has a pressure relief valve 15 set to open before the pressure becomes excessive in relation to the strength of the tank 12.

The apparatus 10 includes a conduit circuit 16 connected at inlet and outlet ends 17 and 18 to the storage tank 12. Disposed in the conduit circuit 16 is a motor-driven pump 19 shown schematically to be a gear pump. A pump not employing a piston-cylinder mechanism is preferred. The pump 19 has an intake side 20 and a discharge side 21. Downstream of the pump 19 is a valve 22 which is opened and closed in response to energization and de-energization of a solenoid 23. Leading from the conduit circuit 16 between the discharge side 21 of the pump 19 and the valve 22 is another conduit 25 having a flexible portion 26. A valve 27 is disposed in the conduit 25 near its discharge end. The conduit 25 is detachably connectable to the vessel 11 by a coupling 28. Near the inlet and outlet ends 17 and 18 of the conduit circuit 16 are manually operable valves 29 and 30. A valve 31 employed in priming the apparatus 10 leads from the conduit circuit 16 upstream of the intake side 20 of the pump 19.

In order to limit the pressure differential between the intake and discharge sides 20 and 21 of the pump 19, there is provided a by-pass generally indicated at 32 which includes a conduit 33 connected at opposed ends to the conduit circuit 16 upstream and downstream, respectively, of the pump 19. A relief valve 34 in the conduit 33 will open to by-pass liquid in response to an excess in pressure differential between the intake and discharge sides 20 and 21 of the pump 19. Since the pressure differential between the intake and discharge sides 20 and 21 of the pump 19 can be relatively small, a relatively small size pump and drive motor are fully adequate.

A timer generally indicated at 35 is provided to alternately energize and de-energize the solenoid 23 for alternately opening and closing the valve 22. The timer 35 includes an electric motor 36, which is preferably of the synchronous type. The motor 36 operating through a speed reducer 36' rotates a cam generally indicated at 37. The cam 37 is shown to have cam segments 38 and 39. The cam 37 operates a resilient switch arm 41 of a switch generally indicated at 42. The switch 42 is open when the switch arm 41 rides against a low portion 43 of the cam 37 and closed when the switch arm 41 rides against a high portion 44 of the cam 37. The cam segment 39 is adjustable relative to the cam segment 38 to provide a variation in the duration that the switch 42 is open relative to the duration that the switch 42 is closed. An electrical lead 45 leads to the switch 42 and then to the solenoid 23, and a lead 46 leads to a switch 47 and then to the solenoid 23. Leads 48 and 49 connect the motor 36 and the leads 45 and 46. A lead 45' is connected to the lead 45 both before and after the switch 42. The lead 45' contains a switch 45".

By way of example but not limitation, the valves 15 and 34 are set to open at a gauge pressure of about 357 p.s.i. and at a differential pressure of about 75 p.s.i., respectively. The timer 35 is set to keep the valve 22 open for about 5 seconds and closed for about 10 seconds. These settings are particularly useful when filling vessels of capacities of about 10 to 20 pounds with a vaporizable liquid such as liquid carbon dioxide. The pump is preferably a Viking FH–695 rotary gear pump having electric motor developing ½ H.P. at 1,725 r.p.m., and manufactured by the Viking Pump Co.

The apparatus 10 is initially primed before any vessels are filled. Assuming that the manual valves 27, 29, 30 and 31 and the solenoid-operated valve 22 are initially closed, the valves 29 and 31 are opened to vent any vapor which may exist between the inlet end 17 of the conduit circuit 16 and the intake side 20 of the pump 19. When all the vapor has been vented, the valve 31 is closed, the valve 30 is opened, the switch 45" is closed, and the pump 19 is started. The liquid is now free to circulate around the conduit circuit 16 since the solenoid 23 is energized to open the valve 22. The priming is complete when the liquid has been circulating around the circuit 16 for a sufficient period of time to cool the various conduits and valves and the pump. The switch 45" is then opened and the switch 47 is closed when vessels are ready to be filled.

When the first vessel 11 is to be filled, the conduit 25 is connected to the vessel 11 by the coupling 28, and thereafter the valve 27 is opened. At the instant the valve 27 is open, the valve 22 may either be open or closed depending upon the position of the cam 37. If the valve 22 is open, some liquid for example, liquid carbon dioxide will pass into the vessel 11, due to the pressure in the conduit circuit 16. When the liquid contacts the inside of the vessel 11 which is relatively "warm," vaporization will occur with a resultant increase in vapor pressure in the vessel 11 which is closed to the atmosphere. So long as the valve 22 is open and the pressure in the vessel 11 exceeds the pressure in the conduit circuit 16, gaseous or vapor carbon dioxide will pass from the vessel 11 through the conduit 25, through a portion of the conduit circuit 16 downstream of the pump 19 and into the tank 12. When the valve 22 is closed, and assuming that the pressure in the conduit circuit 16 between the discharge side 21 of the pump 19 and the valve 22 is greater than the pressure in the vessel 11, liquid will be pumped into the vessel 11. When the valve 22 opens, the pressure in the vessel 11 will cause gaseous carbon dioxide to be returned to the storage tank 12. Liquid is alternately automatically filled into the vessel 11 and vapor vented from the vessel 11 to the tank 12 depending upon whether the valve 22 is closed or open. When the vessel 11 has been filled to the desired weight, the valve 27 is closed and the coupling 28 is uncoupled from the conduit 25. Other vessels can then be successively coupled to the conduit 25. Each of the vessels 11 has a valve (not shown) to prevent escape of the liquid which is in the vessel under pressure. When both valves 22 and 27 are closed, pressure will build up in the conduit circuit 16 between the discharge side 21 of the pump 19 and the valve 22. When this pressure exceeds the preselected level at which the relief valve 34 is set, liquid will be by-passed around the pump 19 through the conduit 33.

FIGURE 2 illustrates another embodiment of the invention in which like components are designated by the same reference characters as in the embodiment of FIGURE 1, with the addition of letter "a." Apparatus 10a differs from apparatus 10 in that a by-pass conduit 50 having a relief valve 51 is connected at one end to a conduit circuit 16a downstream of a discharge side 21a of a pump 19a and at the other end to the lower region of the storage tank 12a. Additionally, the conduit circuit 16a has an outlet end 52 connected to the upper region of a tank 12a to provide communication with vapor 14a.

A conduit 53 leads from the lower region of the tank 12a to a vaporizer 54 for converting the vaporizable liquid into a vapor. A conduit 55 connects the vaporizer 54 and the upper region of the tank 12a. With the vaporizer 54 in operation, vapor passes through outlet end 56 of the conduit 55 into the vapor space in the tank 12a and then through a conduit 57 to a bottling station having a bottling apparatus schematically indicated at 58. The conduit 57 has a valve 59. The bottling apparatus 58 is employed to charge or fill the gas into a vessel 60 along with other ingredients to provide a bottled carbonated beverage. Since the outlet end 52 of the conduit circuit 16a discharges vapor above the level of the liquid 13a, the pressure increase in the storage tank 12a is greater than the pressure increase in the storage tank 12 in the embodiment of FIGURE 1 where the vapor is discharged below the level of the liquid 13 and thus passes directly into the liquid 13.

Vapor formed in vessels such as the vessel 11a passes through a portion of the conduit circuit 16a into the storage tank 12a, and passes through the conduit 57 to the bottling apparatus 58 when the valve 59 is open. Thus, the vapor formed in the vessel 11a is capable of being utilized to charge bottles or vessels such as the vessel 60 to form a bottled carbonated beverage. The vaporizer 54 is required to be operated only when insufficient vapor is formed in the vessels 11a and the tank 12a to satisfy the requirements at the bottling station. Either one or both outlet ends 52 and 56 of the conduit circuit 16a and the conduit 55, respectively, can lead directly to the bottling apparatus 58 rather than into the storage tank 12a, if desired.

There is thus provided a method for filling some vessels with vaporizable liquids and for filling other vessels with vapor, which involves pumping vaporizable liquid from a source of supply through a conduit, alternately diverting the pumped liquid into a vessel and diverting vapor formed in the vessel to a bottling apparatus to fill vapor into another vessel, vaporizing additional liquid from the source of supply only when the vapor available to the bottling apparatus is insufficient, and conducting the additional vapor to the bottling apparatus.

Other embodiments and modifications of this invention will suggest themselves to those skilled in the art and all such of these as come within the spirit of this invention are included within its scope as best defined by the appended claims.

I claim:

1. In an apparatus for filling a vessel with vaporizable liquid: a conduit circuit adapted to be connected at both ends to a storage tank for storing vaporizable liquids, a pump disposed in said conduit circuit, a first valve disposed in said conduit circuit downstream of said pump, electrical timing means operable to alternately open and close said first valve, a conduit leading from said conduit circuit between the discharge side of said pump and said first valve and adapted to be connected to a vessel, and a second valve disposed in said conduit, so that when said first valve is closed and said second valve is open liquid can be pumped from said storage tank, through a portion of said conduit circuit, and through said conduit to fill a vessel and when said first and second valves are open, permitting vapor to pass from the vessel through said conduit and through another portion of said conduit circuit into said storage tank.

2. The invention defined in claim 1, including means for varying the duration said first valve is closed with respect to the duration said first valve is open.

3. In an apparatus for filling a vessel with vaporizable liquid a conduit circuit adapted to be connected at both ends to a storage tank for storing vaporizable liquid, a pump disposed in said conduit circuit, a first valve disposed in said conduit circuit downstream of said pump, a conduit leading from said conduit circuit between the discharge side of said pump and said first valve and adapted to be connected to a vessel, a second valve disposed in said conduit, and means for alternately closing said first valve to permit liquid flow through a portion of said conduit circuit and through said conduit into a vessel and opening said first valve to permit vapor to pass from the vessel through said conduit and through another portion of said conduit circuit into said storage tank.

4. In apparatus for filling a vessel with vaporizable liquid a conduit circuit adapted to be connected at both ends to the bottom region of a storage tank, a pump disposed in said conduit circuit, means for limiting the pressure differential between the intake and discharge sides of said pump, a first valve disposed in said conduit circuit downstream of said pump, a conduit leading from said conduit circuit between the discharge side of said pump and said first valve and adapted to be connected to a vessel, a second valve disposed in said conduit, and means for alternately closing said first valve to permit liquid flow through a portion of said conduit circuit and through said conduit into a vessel and opening said first valve to permit vapor to pass from the vessel through said conduit and through another portion of said conduit circuit into said storage tank.

5. In an apparatus for filling a vessel with vaporizable liquid such as carbon dioxide and for filling another vessel with its vapor: a conduit circuit adapted to be connected at both ends to a storage tank for storing a vaporizable liquid such as carbon dioxide and its vapor, a pump disposed in said conduit circuit, a first valve disposed in said conduit circuit downstream of said pump, a conduit leading from said conduit circuit between the discharge side of said pump and said first valve and adapted to be connected to a vessel, a second valve disposed in said conduit, means for alternately closing said first valve to permit liquid flow through a portion of said conduit circuit and through said conduit into a vessel and opening said first valve to permit vapor to pass from the vessel through said conduit and through another portion of said conduit circuit into said storage tank and to permit simultaneously return to said storage tank of liquid being pumped in the conduit circuit.

6. Method for filling a vessel with vaporizable liquid and for filling another vessel with vapor, comprising the steps of: pumping vaporizable liquid from a storage tank through a conduit, alternately diverting the pumped liquid into a vessel and diverting vapor formed in the vessel to a bottling station to fill vapor into another vessel, vaporizing additional liquid from the storage tank when the vapor available to the bottling station is insufficient, and conducting the additional vapor to the bottling station.

7. Method for filling a vessel with liquid carbon dioxide and for filling another vessel with gaseous carbon dioxide, comprising the steps of: pumping liquid carbon dioxide from a storage tank through a conduit, alternately diverting the liquid carbon dioxide into a vessel and diverting gaseous carbon dioxide formed in the vessel to a bottling station to fill gaseous carbon dioxide into another vessel, vaporizing additional liquid carbon dioxide from the storage tank when the gaseous carbon dioxide available to the bottling station is insufficient, and conducting the additional gaseous carbon dioxide to the bottling station.

References Cited by the Examiner

UNITED STATES PATENTS

| | | | |
|---|---|---|---|
| 2,291,678 | 8/1942 | Benz et al. | 62—55 X |
| 3,049,142 | 8/1962 | Oliver | 137—624.17 X |

LAVERNE D. GEIGER, *Primary Examiner.*

H. BELL, *Assistant Examiner.*